United States Patent [19]

Pawlowski

[11] Patent Number: 5,690,722
[45] Date of Patent: Nov. 25, 1997

[54] USE OF TETRAFLUOROPROPANOL AS CO-SOLVENT IN INK-JET INK VEHICLES

[75] Inventor: Norman E. Pawlowski, Corvallis, Oreg.

[73] Assignee: Hewlett-Packard Company, Palo Alto, Calif.

[21] Appl. No.: 738,531

[22] Filed: Oct. 28, 1996

[51] Int. Cl.$^6$ .................................................. C09D 11/02
[52] U.S. Cl. ............................ 106/31.58; 106/31.53; 106/31.82; 106/31.86
[58] Field of Search .......................... 106/31.58, 31.86, 106/31.53, 31.82

[56] References Cited

U.S. PATENT DOCUMENTS

| | | | |
|---|---|---|---|
| 5,091,005 | 2/1992 | Mueller et al. | 106/31.43 |
| 5,106,416 | 4/1992 | Moffatt et al. | 106/31.59 |
| 5,116,409 | 5/1992 | Moffatt | 106/22 R |
| 5,181,045 | 1/1993 | Shields et al. | 346/1.1 |
| 5,198,023 | 3/1993 | Stoffel | 106/22 R |
| 5,320,668 | 6/1994 | Shields et al. | 106/31.28 |
| 5,342,439 | 8/1994 | Lauw | 106/31.59 |
| 5,342,440 | 8/1994 | Wickramanayake | 106/22 R |
| 5,462,592 | 10/1995 | Murakami et al. | 106/31.59 |
| 5,476,540 | 12/1995 | Shields et al. | 106/31.27 |
| 5,531,817 | 7/1996 | Shileds et al. | 106/31.27 |
| 5,536,306 | 7/1996 | Johnson et al. | 106/31.59 |
| 5,565,022 | 10/1996 | Wickramanayake | 106/31.59 |
| 5,626,655 | 5/1997 | Pawlowski et al. | 106/31.59 |

*Primary Examiner*—Helene Klemanski

[57] ABSTRACT

An ink-jet ink composition and a method for printing are provided which involve the use of tetrafluoropropanol (TFP), and preferably 2,2,3,3-TFP, as a co-solvent to impart improved bleed control, dot gain, and edge acuity characteristics to the ink as well as to reduce the dry time upon printing onto a print medium. Preferably, the ink-jet ink composition comprises a dye, 2,2,3,3-TFP, 2-ethyl-2-hydroxymethyl-1,3-propanediol, sodium alginate, and water. In an ink-jet ink set in which the color inks are dye-based ink-jet inks compositions formulated to include 2,2,3,3-TFP in accordance with the invention, but when the black ink is a pigment-based suspension without 2,2,3,3-TFP, black to color bleed may be controlled by further adding any one of calcium nitrate, magnesium nitrate, tetraethylenepentamine, or polyethylenimine to the color dye-based inks.

22 Claims, No Drawings

USE OF TETRAFLUOROPROPANOL AS CO-SOLVENT IN INK-JET INK VEHICLES

TECHNICAL FIELD

The present invention relates to ink compositions employed in ink-jet printing, especially in thermal ink-jet printing, and, more particularly, to the use of a co-solvent in ink-jet ink compositions to improve their dry time, dot gain, bleed control, and edge acuity.

BACKGROUND ART

Ink-jet printing is a non-impact printing process in which droplets of ink are deposited on print media, such as paper, transparency film, or textiles. Low cost and high quality of output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two common means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through orifices associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Many inks that are described for use in ink-jet printing are associated with non-thermal ink-jet printing, such as piezoelectric ink-jet printing. Inks suitably employed in such non-thermal applications often cannot be used in thermal ink-jet printing due to the effect of heating on the ink composition.

In commercially-available thermal ink-jet color printers, such as a DeskJet® printer available from Hewlett-Packard Company, a color spectrum is achieved by combining cyan, magenta, and yellow inks in various proportions. Ink-jet inks are mostly available as dye-based compositions, although a very limited number of black pigment-based ink-jet inks are also available. Thus, cyan, magenta, and yellow inks typically derive their hues from cyan, magenta, and yellow dyes, respectively. The particular set of dyes so employed constitutes a so-called "dye set". Color printers typically employ a four-pen set containing cyan, magenta, and yellow inks as well as a black ink, which is typically used for printing text.

The dye-based color thermal ink-jet inks are typically formulated by dissolving dye in an aqueous-based ink vehicle. The dyes employed in ink-jet ink compositions are often in the form of dye salts made of a dye anion and a cation such as sodium. These dyes are designed to form solids in the target paper substrate by absorption into paper media by at least two mechanisms. In one mechanism the dye is wicked into the paper and absorbed onto active sites of the paper fiber. There is another mechanism operating in which the ink vehicle evaporates, or is wicked away from the dye, leaving solid dye on the paper fibers.

Controlling the behavior of printed ink compositions before absorption of the dye salt in the paper media is crucial in attaining good print quality. For example, many thermal ink-jet inks, when printed in various colors on paper substrates, tend to bleed into one another. The term "bleed", as used herein, is defined to be the invasion of one color into another, as evidenced by a visible ragged border therebetween. To achieve superior print quality, it is necessary to have a border between colors that is clean and free from the invasion of one color into the other.

One solution to the problem of color to color bleed between dye-based ink-jet inks involves increasing the penetration rate of the ink into the paper with the use of surfactants. Surfactants lower the surface tension of the ink to increase the penetration rate of the ink into the print medium, thereby reducing the ink's planar spread across and through the print medium into surrounding inks. To effectively control bleed, the surfactant component should be present in the ink above its critical micelle concentration (cmc), as disclosed in U.S. Pat. No. 5,116,409, entitled "Bleed Alleviation in Ink-Jet Inks", issued to John Moffatt et al and assigned to the same assignee as the present application.

Other methods of reducing bleed between ink-jet inks include (1) employing a precipitating agent in a first ink to induce the precipitation of the colorant in a second ink printed adjacent to and in contact with the first ink (see, e.g., U.S. Pat. No. 5,198,023, issued to Stoffel); (2) inducing the precipitation of pH-sensitive dyes (see, e.g., U.S. Pat. No. 5,181,045, issued to Shields et al); and (3) pairing an ink having a water-soluble colorant with an oil-based ink (see, e.g., U.S. Patent No. 5,342,440, issued to Wickramanayake).

Aside from bleed control, another important factor that must be considered in achieving good print quality is the degree of dot gain of the ink-jet ink. Dot gain is defined herein as the amount of spread for a given dot size compared to no spreading. Thus, a low dot gain ink does not spread as much as a high dot gain ink. Another way of viewing this is that for a given dot size, where a smaller drop volume gives the same dot size as a larger volume of ink, gain is attained. It is generally preferable that an ink exhibit high dot gain, although edge acuity might be sacrificed as a tradeoff due to uneven lateral spread of the ink across the print medium.

A high dot gain ink is advantageous in several ways. By employing a high dot gain ink, one may use a lower drop volume of ink. The mount of ink used to print a page may therefore be decreased for high dot gain ink, translating to a lower cost per page. Moreover, cockle of the paper may be reduced by employing a lower drop volume of ink because of the lesser amount of water contacting the paper. Therefore, a print cartridge with a high dot gain ink is advantageous in reducing cost-per-page, bleed, and paper cockle.

In addition to the above measuring sticks of good print quality (namely, bleed control, high dot gain, and edge acuity), it is important to decrease the dry times of ink-jet inks. Ink-jet printers are expected to perform faster and at ever increasing levels of throughput. Consequently, it is important to correspondingly decrease the dry times of printed ink-jet inks to enable high speed printers to reach their potential throughput.

A need remains for an ink-jet ink composition and method of printing that at once exhibits good bleed control, relatively high dot gain, sharp edge acuity, and fast dry times. The manner of achieving these sometimes conflicting characteristics must be easily implemented and cost-effective.

DISCLOSURE OF INVENTION

In accordance with the invention, an ink-jet ink composition is provided which employs tetrafluoropropanol as a co-solvent in order to improve print quality. Specifically, the ink-jet ink composition comprises at least one colorant and a vehicle, with the vehicle including tetrafluoropropanol. By incorporating tetrafluoropropanol into an ink-jet ink composition, one enhances bleed control, dot gain, and edge acuity, while also accelerating dry time. Further, an ink-jet ink composition containing tetrafluoropropanol has the tendency to remain on the print medium surface and therefore exhibit unusually vivid and vibrant colors.

A method of improving print quality by incorporating tetrafluoropropanol into an ink-jet ink composition is also provided. Since typical color ink-jet printers employ an ink set having at least three color inks and a single black ink, it is contemplated that any or all of the inks may be formulated according to the present invention to achieve high quality printing. Preferably, at least the color inks in a set of ink-jet inks would be formulated in accordance with the invention.

The present ink-jet ink compositions and method of improving print quality provided herein may be used with a variety of ink-jet printers such as continuous, piezoelectric drop-on-demand printers and thermal or bubble jet drop-on-demand printers. Printing may be done on a variety of media; examples include paper, textiles, and transparencies. The improvement in print quality characteristics and dry time achieved in the practice of the invention enables ink-jet printers to effect high print quality in a cost-effective manner.

BEST MODES FOR CARRYING OUT THE INVENTION

In accordance with the invention, improved print quality is achieved with inkjet inks containing tetrafluoropropanol as a co-solvent. Specifically, the present ink-jet ink compositions comprise at least one colorant and a vehicle, with the vehicle including the co-solvent tetrafluoropropanol, which serves to enhance bleed control, dot gain, and edge acuity, while also accelerating dry time. Preferably, 2,2,3,3-tetrafluoropropanol is employed in the practice of the invention.

Before specifically addressing the ink-jet ink components of the present composition, it is noted that the purity of all components employed in the practice of the invention is that employed in normal commercial practice for ink-jet printing. Weight percents represent percent of total ink-jet ink composition, unless otherwise indicated.

The co-solvent tetrafluoropropanol (hereinafter "TFP") has the formula $C_3H_4F_4O$. The preferred isomer 2,2,3,3-TFP is compound number #76-37-9 in the Chemical Abstracts Registry. 2,2,3,3-TFP has a boiling point within the range of about 107° to 109° C. and a dielectric constant of about 1.47 at 20° C., which is relatively high compared to other alcohols. Although TFP contains four fluorine atoms, it is not a "fluorocarbon" as that term is loosely used to describe chlorofluorocarbons (CFC's) that are detrimental to the ozone layer. Rather, TFP is totally miscible with water and, unlike CFC's, would be expected to be washed from the atmosphere by precipitation. Analogs of TFP are commonly used in the chemical industry during the synthesis of tetrafluoroethylene (commercially known as Teflon™).

In the practice of the invention, TFP may be added to the ink-jet ink composition at a concentration in the range of about 5 to 50 wt % of the ink. Preferably, TFP represents about 10 to 30 wt % of the ink composition, and most preferably, about 20 wt %. Less than about 5 wt % TFP in an ink-jet ink is insufficient to effect the desired print quality improvements, while more than about 50 wt % TFP decreases print quality by excessively increasing dot gain.

By adding TFP to an ink-jet ink composition, one achieves at once enhanced dot gain, edge acuity, and bleed control, while also accelerating dry time. The addition of TFP achieves each of these sometimes conflicting goals by slowing the absorption of the ink-jet ink into the print medium. As described above in the "Background" section, dyes form solids in a target paper substrate by at least two mechanisms, namely (1) by absorption into the paper and/or (2) by remaining atop the print medium following evaporation of the ink vehicle. Without subscribing to any particular theory, it is conjectured that TFP increases the tendency for the ink vehicle to wick away from the dye according to the latter mechanism, thereby leaving the solidified dye atop the print medium.

It has been observed that inks containing TFP absorb more slowly than other inks containing surfactants. TFP does not act as a fluorosurfactant: TFP is not a micelle-forming solvent and, unlike such surfactants, TFP does not interact to any substantial degree with starch and cellulose. Rather, a majority of the TFP remains on top of the print medium, spreading out laterally and evenly. Also, colorants in TFP-containing inks tend to spread evenly to the edge of a dot. In contradistinction, inks containing surfactants penetrate into a paper medium and their absorption thereinto is affected by paper defects, such that the lateral spread of surfactant-containing inks can be uneven leading to poor edge acuity. Also, with surfactant-containing inks, the colorant decreases in intensity at the edge of a dot. Thus, whereas dots of surfactant-containing inks are uneven and asymmetrical with varying intensity toward the dot edge, dots of TFP-containing ink are round and substantially symmetrical with even color distribution.

The consequences of achieving an even lateral spread of ink across the surface of a print medium are the unexpected and typically opposed characteristics of high dot gain with good edge acuity. Dot gain in the present ink-jet inks is directly proportional to TFP concentration. For example, when employing a pen from Hewlett-Packard's DeskJet® 850 printer, an ink containing about 20 wt % TFP has an optimum drop volume of about 22 to 24 pl, compared to 31 pl for a surfactant-containing ink typically employed in that type of printer as commercially available. For an ink containing about 30 wt % TFP, optimum drop volume is about 17 pl. Since increasing dot gain decreases the amount of ink required for a given image, the incorporation of TFP into ink-jet inks is economically advantageous to printer users.

It is noted that in judging drop volume as a function of area coverage, one should be careful to discern the difference between misdirected nozzles and too low drop volume. Streaks in graphic areas are sometimes due to misdirected nozzles, while too low drop volume produces white spaces between dots in all areas.

While surfactants typically improve dot gain at the expense of edge acuity, the addition of TFP in the practice of the invention achieves both enhanced dot gain and good edge acuity. The lateral spread of the TFP-containing inks is not controlled by absorption through paper fibers and is thus not subject to disruption by imperfections and discontinuities within the paper medium itself. Therefore, the evenness of the lateral spread of the present inks results in good edge acuity. It is noted that, in judging edge acuity, one should inspect text characters carefully to distinguish between poor edge acuity, or fuzzy lines, and misdirected drops.

The addition of TFP to ink-jet inks also provides bleed control. Without subscribing to any particular theory, one possible mechanism by which bleed control is achieved using TFP is that the inks do not follow paper fibers to bleed into one another, but rather laterally expand on the surface of the paper in a controlled and predictable manner. Therefore, one can devise a printer mechanism that prevents bleed between adjacently-printed inks by calculating and planning for the degree of lateral spread. It is noted that the bleed control achieved in the practice of the invention by the addition of TFP to ink-jet inks is roughly equivalent to that conventionally achieved with the addition of surfactants.

Bleed control using TFP alone is achieved between each ink in an ink set only if all of the inks contain TFP in accordance with the present invention. Thus, it would be preferable for each ink in a set to be TFP-containing inks in accordance with the practice of the invention. However, commercially-available ink-jet printers such as Hewlett Packard's DeskJet® 850 commonly pair pigment-based carbon-suspension black inks with dye-based color inks. While it is contemplated that such pigment-based carbon-suspension black inks may indeed benefit from the addition of TFP, in practice these black inks may be employed without TFP in their commercially-available form.

If the color inks contain TFP but the black ink is not formulated in accordance with the invention, the TFP would provide color to color bleed control but not black to color bleed control. However, the black to color bleed can be controlled by adding a component to the color inks that induces precipitation of the black colorant. Specifically, precipitation of a black pigment is achieved by adding about 1 wt % $Ca(NO_3)_2 \cdot 4H_2$ or $Mg(NO_3)_2 \cdot 2H_2O$, or about 0.25 wt % polyethylenimine (PEI) or tetraethylenepentamine (TEPA), to the TFP-containing color inks, any of which work equally well in controlling black to color bleed. These additives induce precipitation of black pigment-based inks, since the pigment-suspending agent in such inks is typically carboxylated. It is noted, however, that one would not use alginates in the color inks when employing these additives, since alginates are carboxylated and will also precipitate upon contact with calcium nitrate, PEI, or TEPA.

Additional benefits of increasing the tendency of the ink to remain on the surface of the print medium are fast dry times and reduced paper cockle. It is conjectured that, since the present TFP-containing inks tend to remain on the surface of the print medium, the ink vehicles have greater exposure to the atmosphere and to evaporative forces, thereby enhancing dry time. Dry time is also enhanced by TFP's lower heat of vaporization. Dry time is typically about one to two seconds in the practice of the invention, except in heavy graphic areas with secondary colors, in which the dry time will be less than about five seconds. The occurrence of paper cockle is decreased since the ink vehicle does not substantially invade paper fibers.

The addition of TFP is contemplated to benefit any aqueous-based ink-jet ink composition, but the invention is not so limited. However, the present ink-jet ink compositions are particularly contemplated to pair the benefits of TFP with those of employing a humectant compound as a primary solvent. Examples of suitable humectants include, but are not limited to, polyols (particularly diols, a.k.a. glycols) and glycol ethers. Examples of glycols include, but are not limited to, glycols such as ethylene glycol, diethylene glycol, triethylene glycol, tetraethylene glycol, propylene glycol, polyethylene glycol, polypropylene glycol, thioglycol, and derivatives thereof, and diols such as propanediol, butanediol, pentanediol, hexanediol, and homologous diols. Additional co-solvents may also be employed, such as glycol esters; long chain alcohols such as butyl alcohol, pentyl alcohol, and homologous alcohols; and other low vapor pressure, water-miscible solvents such as esters; ketones; lactones such as γ-butyrolactone; lactams such as N-pyrrolidone, 2-pyrrolidone, and N-(2-hydroxyethyl) pyrrolidone; and glycerols and their derivatives. Preferably, up to about 30 wt % 2-ethyl-2-hydroxymethyl-1,3-propanediol (a.k.a., 1,1,1-tris [hydroxymethyl]propane or EHPD) is employed as a primary solvent/humectant in the practice of the invention. The addition of EHPD (or a humectant) enhances decap performance of the present ink-jet ink compositions.

The term "decap" refers to the reluctance or ease of a pen to clear its nozzles after a delay or pause in printing, and is caused by a viscous plug in one or more of the nozzles or by crusting of the ink or crystallization of the dye in or around one or more of the nozzles.

In decap, ink droplets ejected through the orifice may be misdirected, or if the orifice is completely blocked, ink droplets may not be ejectable through the affected orifice. The addition of a humectant improves decap performance by decreasing the rate of evaporation of the ink vehicle at the interface between the orifice and the atmosphere. For example, an ink containing about 20 wt % TFP and 5 wt % EHPD exhibits good decap, such that a pen left uncapped for days can clear itself within a few lines of print. However, decap is even further improved by increasing EHPD to about 15 wt % with little or no effect upon other ink performance parameters except for a small increase in dry time. Therefore, it is preferred in the practice of the invention that EHPD be employed at about 5 to 15 wt % of the ink-jet ink composition, and most preferably, about 15 wt %. While employing less than about 5 wt % EHPD is simply ineffective, employing more than about 30 wt % of EHPD increases dry time.

In addition to TFP and EHPD, the preferred ink-jet ink composition in the practice of the invention includes a viscosity modifier. Preferably, an alginate such as sodium alginate is employed in the range of about 0.1 to 0.2 wt % of the ink-jet ink composition, and most preferably about 0.15 wt %. For purposes of comparison, TFP-containing inks that do not include an alginate perform similarly to inks employing surfactant and alginate components. The addition of an alginate component is especially crucial in achieving color to color bleed control for in-line printing at higher speeds. For example, while an ink-jet ink containing about 20 wt % TFP in the preferred practice of the invention exhibits good color to color bleed control at about 3 to 4 KHz, the bleed control is unacceptable at 6 KHz. Adding alginate to the ink-jet ink in accordance with the invention enables one to achieve good color to color bleed control at higher frequencies, e.g., 6 KHz. Therefore, the addition of alginate allows one to achieve higher carriage speeds while maintaining the good bleed control deriving from the presence of TFP in the ink-jet ink.

The addition of alginate also improves edge acuity to some degree. In sum, the addition of a small amount of alginate enhances the evenness of the lateral spread of an ink-jet ink achieved with the use of TFP by further slowing the rate of absorption of the ink into the print medium.

However, one must employ alginate sparingly. When an alginate is added to the ink composition at concentrations of 0.3 wt % and above, the ink-jet inks exhibit unacceptable decap problems. Moreover, the amount of alginate added to the ink-jet ink is directly proportional to a decrease in dot gain, so that some of the dot gain achieved with the use of TFP is counterbalanced with the use of alginate. Additionally, an increase in alginate concentration leads to decreased decap performance, counterbalancing the decap improvement achieved with the addition of EHPD.

All told, the most preferred ink composition will comprise, in addition to a colorant about 20 wt % TFP, about 5 to 15 wt % EHPD, and about 0.1 to 0.2 wt % sodium alginate. Further, if the TFP-containing ink composition is to be paired with, e.g., a black pigment-based ink, the preferred ink composition would contain about 1 wt % $Ca(NO_3)_2 \cdot 4H_2O$ rather than the alginate. However, it is again noted that the benefits of TFP are not believed to be exclusive to ink vehicles employing EHPD and sodium alginate. The surface tension of an ink-jet ink formulated in accordance with this preferred composition is about 37 dyne/cm, which is somewhat higher than the surface tensions observed for typical surfactant-containing ink-jet inks. The higher surface tension of the preferred composition illustrates that high dot gain achieved in the practice of the invention does not result from a reduction in surface tension, since surfactant-containing inks exhibit lower dot gain with lower surface tensions.

It is contemplated that any colorant, whether dye or pigment, that is compatible with the remaining components of the ink-jet ink composition may be employed in the practice of the invention. Preferably, the colorant is a water-soluble dye in the practice of the invention and is employed within the range of about 0.1 to 6 wt % of the ink-jet ink composition. Specifically, a black dye is employed in the range of about 2 to 5 wt a yellow dye is employed in the range of about 0.4 to 3 wt %; a blue dye for a cyan ink is employed in the range of about 1.5 to 4 wt %; and a red dye for a magenta ink is employed in the range of about 1 to 4.5 wt %. In the selection of a particular dye, it is important to understand that inks formulated in accordance with the invention remain on the surface of the print medium. While these inks exhibit unusually vivid and vibrant colors by remaining on the print medium surface, they are unusually subject to poor waterfastness and smearfastness. For example, the waterfastness and smearfastness of TFP-containing inks are poor if the dyes employed are very water soluble, such as Acid Blue 9, Acid Red 52, Acid Yellow 23, and Direct Yellow 86. It follows that dyes that lose their water-solubility as the ink dries are most preferred in the practice of the invention.

Consistent with the requirements for this invention, various types of other additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Any of the biocides commonly employed in ink-jet inks may be employed in the practice of the invention, such as NUOSEPT 95, available from Hüls America (Piscataway, N.J.); PROXEL GXL, available from ICI America (Wilmington, Del.); and glutaraldehyde, available from Union Carbide Company (Bound Brook, N.J.) under the trade designation UCARCIDE 250. PROXEL GXL is the preferred biocide. Additionally, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The buffer employed, if any, should provide a pH ranging from about 6 to 9 in the practice of the invention. Examples of preferably-employed buffers include 2-amino-2-(hydroxymethyl)-1,3-propanediol (Trisma Base), which is available from, for example, Aldrich Chemical (Milwaukee, Wis.), and 2-[N-morpholino]-ethanesulfonic acid (MES), sodium salt.

The formulation of the present ink-jet inks does not require special measures. Rather, the various components disclosed above are simply added together and mixed until a uniform solution is achieved.

Thus, the addition of TFP to ink-jet inks improves dot gain, edge acuity, bleed control and dry time.

INDUSTRIAL APPLICABILITY

The present ink-jet ink compositions and method of improving print quality by increasing bleed control, dot gain, and edge acuity while decreasing dry time, as disclosed herein, are expected to find commercial use in ink-jet printing.

Thus, there has been disclosed an ink-jet ink composition and a method of printing which result in improved print quality with the incorporation of a tetrafluoropropanol co-solvent. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An ink-jet ink composition for ink-jet printing comprising at least one colorant and a vehicle, said vehicle including tetrafluoropropanol.

2. The ink-jet ink composition of claim 1 wherein said tetrafluoropropanol is 2,2,3,3-tetrafluoropropanol.

3. The ink-jet ink composition of claim 1 wherein said tetrafluoropropanol is present in said ink-jet ink composition within the range of about 5 to 50 wt %.

4. The ink-jet ink composition of claim 3 wherein said tetrafluoropropanol is present in said ink-jet ink composition within the range of about 10 to 30 wt %.

5. The ink-jet ink composition of claim 4 wherein said tetrafluoropropanol is present in said ink-jet ink composition at a concentration of about 20 wt %.

6. The ink-jet ink composition of claim 1 wherein said colorant is a dye.

7. The ink-jet ink composition of claim 1 wherein said vehicle also contains at least one humectant selected from the group consisting of polyols and glycol ethers and, optionally, at least one co-solvent selected from the group consisting of glycol esters, long chain alcohols, esters, ketones, lactones, lactams, and glycerols, and their derivatives.

8. The ink-jet ink composition of claim 7 wherein said humectant consists essentially of 2-ethyl-2-hydroxymethyl-1,3-propanediol at a concentration within the range of about 5 to 30 wt % of said ink-jet ink composition.

9. The ink-jet ink composition of claim 8 wherein said 2-ethyl-2-hydroxymethyl-1,3-propanediol is present in said ink-jet composition at a concentration within the range of about 5 to 15 wt %.

10. The ink-jet ink composition of claim 1 wherein said vehicle also contains a sodium alginate at a concentration in the range of about 0.1 to 0.2 wt % of said ink-jet ink composition.

11. The ink-jet ink composition of claim 10 wherein said sodium alginate is present in said ink-jet composition at a concentration of about 0.15 wt %.

12. The ink-jet ink composition of claim 1 wherein said ink-jet ink composition also contains a bleed control agent selected from the group consisting of calcium nitrate, magnesium nitrate, tetraethylenepentamine, and polyethylenimine, said bleed control agent serving to control bleed between said ink-jet ink composition and a second pigment-based ink-jet ink.

13. An ink-jet ink composition for ink-jet printing comprising:

(a) about 0.1 to 6 wt % of a dye;

(b) about 10 to 30 wt % 2,2,3,3-tetrafluoropropanol;

(c) about 5 to 15 wt % 2-ethyl-2-hydroxymethyl-1,3-propanediol;

(d) about 0.1 to 0.2 wt % sodium alginate; and (e) the balance water.

14. The ink-jet ink composition of claim 13 comprising:

(a) about 0.1 to 6 wt % of a dye;

(b) about 20 wt % 2,2,3,3-tetrafluoropropanol;

(c) about 15 wt % 2-ethyl-2-hydroxymethyl-1,3-propanediol;

(d) about 0.15 wt % sodium alginate, and (e) the balance water.

15. A method of increasing bleed control between adjacent colors, dot gain, edge acuity, and decreasing dry time of an ink-jet ink for ink-jet printing, said ink-jet ink comprising at least one colorant and a vehicle, said method comprising incorporating tetrafluoropropanol into said vehicle to form an improved vehicle.

16. The method of claim 15 wherein said tetrafluoropropanol is 2,2,3,3-tetrafluoropropanol.

17. The method of claim 15 wherein said tetrafluoropropanol is present in said ink-jet ink within the range of about 5 to 50 wt %.

18. The method of claim 17 wherein said tetrafluoropropanol is present in said ink-jet ink within the range of about 10 to 30 wt %.

19. A method of printing an ink-jet ink on a medium, said ink-jet ink comprising at least one colorant and a vehicle, said method comprising (a) providing tetrafluoropropanol in said vehicle and (b) printing said ink-jet ink onto said medium, thereby increasing bleed control between adjacent colors, dot gain, edge acuity, and decreasing dry time of said ink-jet ink for ink-jet printing.

20. The method of claim 19 wherein said tetrafluoropropanol is 2,2,3,3-tetrafluoropropanol.

21. The method of claim 19 wherein said tetrafluoropropanol is present in said ink-jet ink within the range of about 5 to 50 wt %.

22. The method of claim 21 wherein said tetrafluoropropanol is present in said ink-jet ink within the range of about 10 to 30 wt %.

* * * * *